United States Patent [19]
Haneda et al.

[11] Patent Number: 5,198,865
[45] Date of Patent: Mar. 30, 1993

[54] COLOR IMAGE FORMING APPARATUS

[75] Inventors: Satoshi Haneda; Hisao Satoh; Tadayoshi Ikeda; Masakazu Fukuchi, all of Hachioji; Shizuo Morita, Tachikawa, all of Japan

[73] Assignee: Konica Corporation, Tokyo, Japan

[21] Appl. No.: 787,135

[22] Filed: Nov. 4, 1991

[30] Foreign Application Priority Data

Nov. 9, 1990 [JP] Japan ................................ 2-304634
Nov. 9, 1990 [JP] Japan ................................ 2-304635

[51] Int. Cl.$^5$ ............................................ G03G 15/01
[52] U.S. Cl. .................................... 355/326; 355/210; 355/233; 355/235; 355/202; 358/75; 358/449
[58] Field of Search ............... 355/326, 327, 210, 211, 355/212, 213, 232, 233, 235, 202; 346/157, 160; 358/75, 300, 494, 486, 449, 488, 487

[56] References Cited

U.S. PATENT DOCUMENTS 5,070,374 12/1991 Murahashi et al. ............... 358/75 X
5,091,789 2/1992 Haneda et al. ..................... 358/75 X

FOREIGN PATENT DOCUMENTS

0223857 10/1986 Japan .

Primary Examiner—A. T. Grimley
Assistant Examiner—Matthew S. Smith
Attorney, Agent, or Firm—Finnegan, Henderson, Farabow, Garrett & Dunner

[57] ABSTRACT

A color copier which can be adopted to a printer operation for a peripheral imaging machine. The color copier forms plural color component toner layers on a photoreceptor layer by layer at each rotation of the photoreceptor. In the mode that the color copier is used as a printer, the copier makes two pages of each of the color component toner layers corresponding to an image at one rotation of a rotatable photoreceptor, when the size of the image is not more than one half the maximum size that can be formed by the copier.

8 Claims, 7 Drawing Sheets

COLOR IMAGE FORMING APPARATUS

BACKGROUND OF THE INVENTION

The present invention relates to a color image forming apparatus wherein a toner image is formed on an image forming member through an electrophotographic system and the toner image is transferred onto a transfer material for obtaining a color image.

Owing to advancement of technologies, color image forming apparatuses have been developed by manufacturers recently. For example, Japanese Patent Publication Open to Public Inspection Nos. 100770/1985, 149972/1986 and 75850/1985 (hereinafter referred to as Japanese Patent O.P.I. Publication) disclose methods for obtaining color copies from a color document, wherein based on image data obtained by reading a document by means of scanning by a scanner of an image reading unit, latent image formation and development thereof are conducted on a photoreceptor drum for the frequency corresponding to the number of colors separated and transferred onto a transfer material to obtain a color image by superposing toner images each having its own color.

Incidentally, in an office where a image forming apparatus is usually used, popular paper sizes each forming an image of one unit include ordinary paper sizes (JIS standards) of A-3, A-4, B-4 and B-5. Therefore, the circumferential length and the width of an image forming member in an image forming apparatus such as a copying machine or the like need to be in size covering at least one of the aforementioned paper sizes. Namely, the circumferential length of the image forming member must include, in addition to the length of the maximum paper size, additional length such as the one for the standard toner image forming area for toner concentration detection and the one corresponding to a period of time necessary for a scanner of an image reading unit to return. The additional length necessary for the scanner to return occupies the greatest part of the total additional length.

However, the printing out speed in an image forming apparatus is the same for all paper sizes. For example, the printing out speed for A-3 size paper is exactly the same as that for A-4 size paper although the length of A-4 size paper is 210 mm which is a half the size of A-3 size paper. The reason behind this is that only a portion of the image forming member is used for image forming. For example, when printing out A-4 size paper under the condition that the maximum paper size is A-3, more than half of the image forming member is not used.

To be concrete, the image forming speed in the image forming apparatus is always the same regardless of the size of an image to be formed on the image forming member, which has been wasteful. In other words, the circumferential length of the image forming member is determined to cope with the maximum image size to be formed, and when the image size is large, the entire surface of the image forming member is used for image forming, while when the image size is small, only a small portion of the image forming member is used for image forming, resulting in a wasteful portion of the image forming member.

Furthermore, if the recent trend of adding high functions to a color image forming apparatus is provided, in addition to its original copy mode, with a print mode as a printer function for forming an image on a transfer material through the image forming system of the image forming apparatus using image data from an output device such as a computer or a word processor, it is not necessary to consider the width for a scanner to return when forming an image using image data from a peripheral output device.

The present invention has been achieved to solve the aforementioned problems, and its object is to provide a color image forming apparatus forming an image of a smaller size through the process that is more complicated than the process for an image of a larger size, wherein the number of image frames formed in a single operation is increased, and thereby the wasteful portion on an image forming member is eliminated and efficiency of operation is enhanced. Another object of the invention is to provide a color image forming apparatus wherein the circumferential length of an image forming member is minimized, thus, the apparatus may be caused, to be small in size and to be light in weight. A further object of the invention is to provide a color image forming apparatus capable of forming images with an optimum frequency of image forming and with high efficiency, in all image forming modes.

SUMMARY OF THE INVENTION

The aforementioned objects of the invention are attained by a color image forming apparatus comprising a copy mode for controlling an image forming unit wherein a toner image is formed when n image data reading scanning for one color, made by an image reading unit, corresponds to 1-round or 2-round process of an image forming member depending on the size of a color image to be formed, and a color image is formed when the toner image forming mentioned above is repeated several times and thereby plural toner images, each having a different color, are superimposed, and comprising a print mode for controlling an image forming process unit wherein a toner image is formed when 1-page or 2-page image data inputted from a peripheral output device corresponds to 1-round process of an image forming member depending on the size of a color image to be formed, and a color image is formed when the toner image forming, mentioned above, is repeated several times and thereby plural toner images each having a different color are superimposed.

DETAILED DESCRIPTION OF THE INVENTION

Examples of the invention will be explained as follows, referring to the drawings attached.

Figure 1:
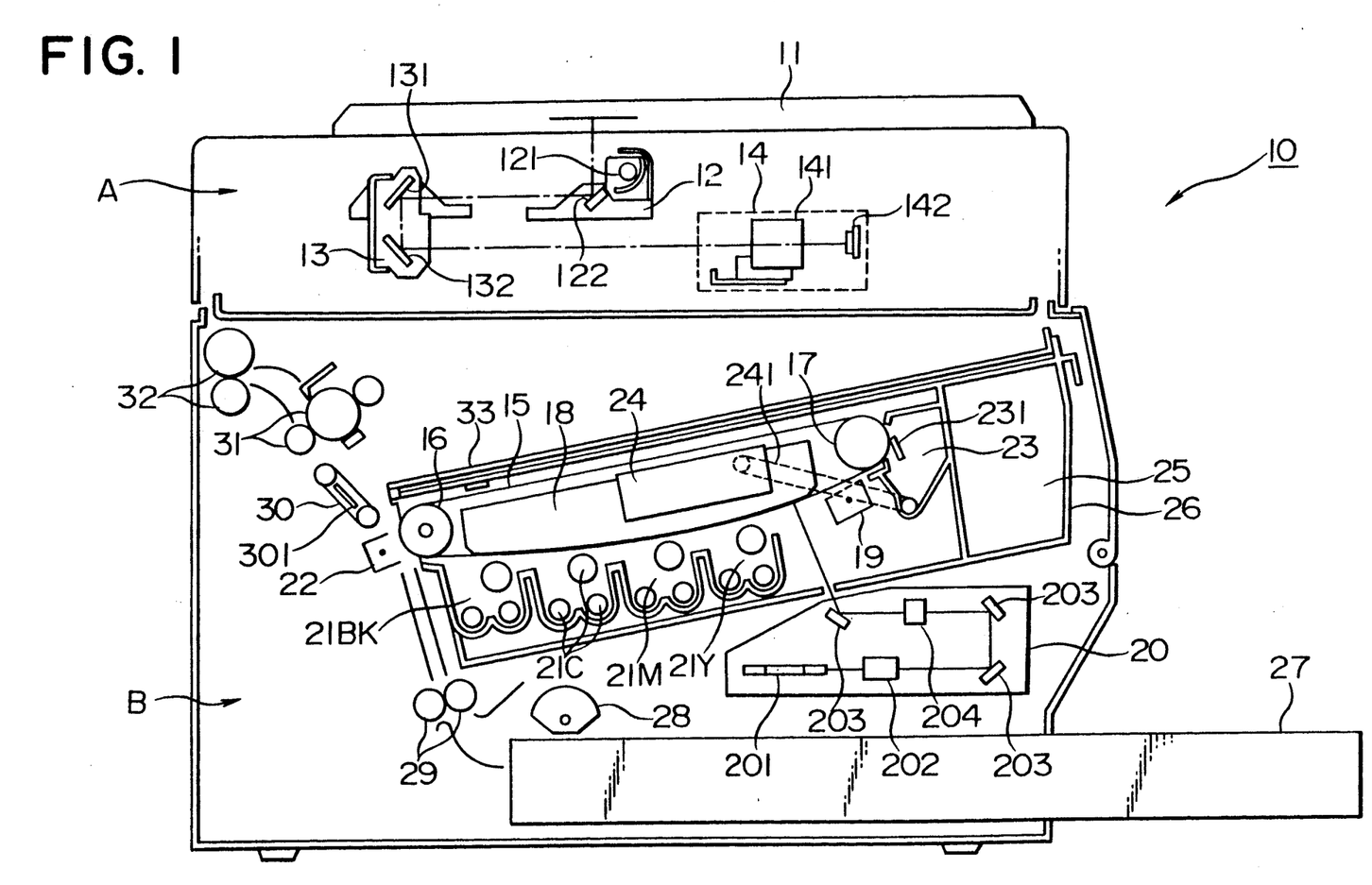
FIG. 1 is a diagram showing the main structure of a color copying machine equipped with a belt-shaped image forming member that is an example of the invention.

FIG. 1 shows the main structure of a color copying machine, that is a color image forming apparatus equipped with a belt-shaped image forming member, as an example of the invention. The color copying machine is composed roughly of image reading unit A and image forming unit B.

The image reading unit A will be explained first, referring to FIG. 1, which is a diagram showing the main structure of the color copying machine.

In the image reading unit A, a document placed on document table 11 is illuminated by halogen lamp 121 affixed to carriage 12 that slides horizontally. Movable mirror unit 13 on which mirrors 131 and 132 are provided also slides in a horizontal direction, and it guides a light image of the document to image reading portion 14 together with mirror 122 affixed to the carriage 12 mentioned above.

The aforementioned carriage 12 and the movable mirror unit 13 mentioned above are driven through a wire (not shown in the drawing) connected to a stepping motor, and move in the same direction at the speed of V and the speed of ½ V, respectively.

Figure 2:
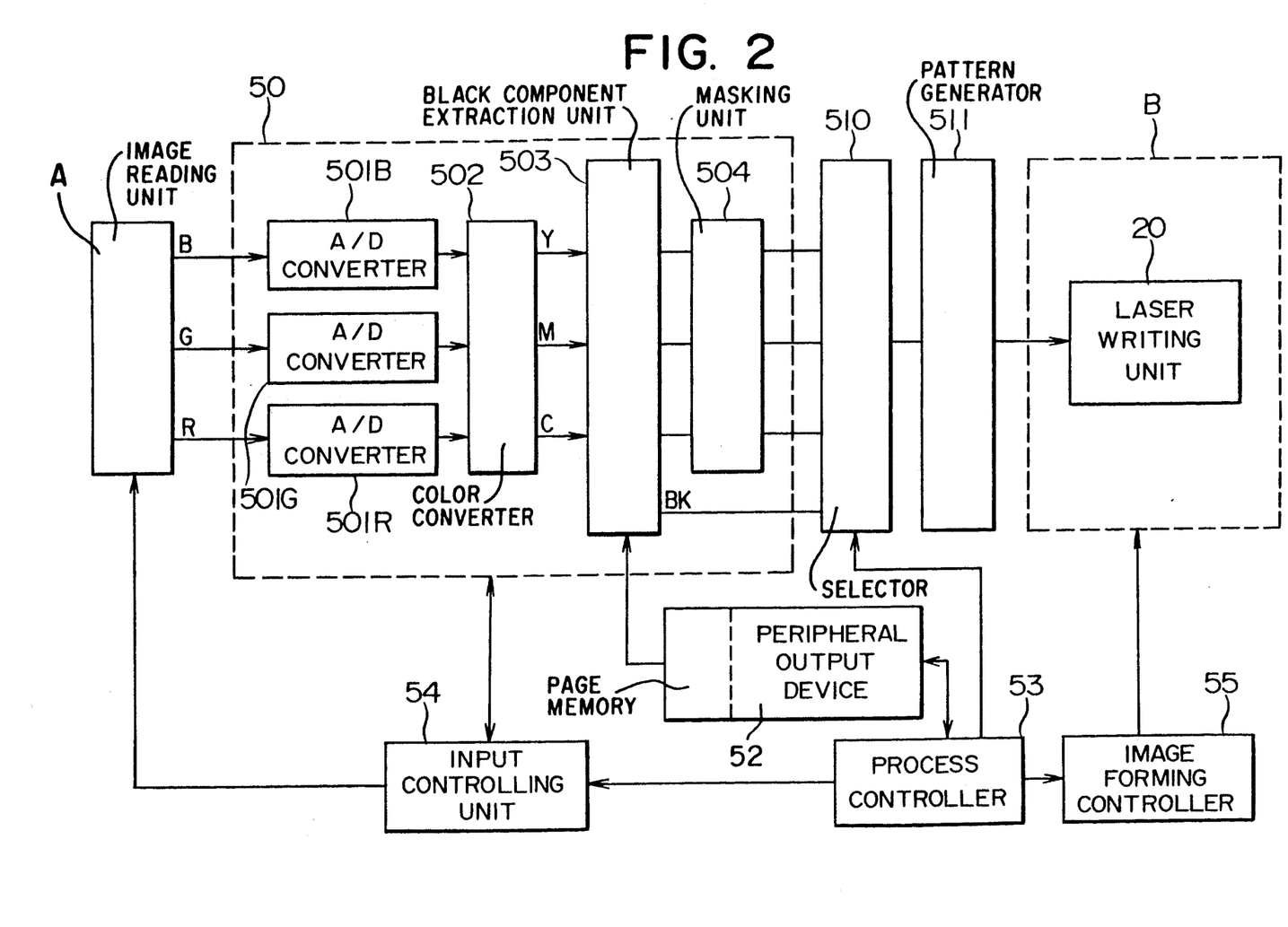
FIG. 2 is a control block diagram relating to a process control means and an image processing means.

The aforementioned image reading portion is provided with color CCDs 142 at the position of lens 141 and the position for image formation that is behind the lens 141. A document is subjected to color separation by means of the color CCD 142 to produce blue image data (B), green image data (G) and red image data (R) all of which are outputted to image processing means 50 which will be explained later, As shown in FIG. 2, image processing means 50 is composed of A/D converters 501B, 501G and 501R, complementary color converter 502, black component extraction unit 503 and masking unit 504.

The A/D converters 501B, 501G and 501R convert color image data composed of image data of blue (B), green (G) and red (R) inputted from color CCDs 142 of the image reading unit A to image data of digital signals with 256 steps of gradation, for example, and send them to the complementary color converter 502 which will be explained later.

The complementary color converter 502 complementary-color-converts the digital signals of color image data converted by the A/D converter 501 to obtain image data of yellow (Y), magenta (M) and cyan (C).

The black component extraction unit 503 extracts image data of black (Bk) from image data of Y, M and C obtained by the complementary color converter 502 through, for example, under color removal (UCR).

The masking unit 504 conducts color correction on image data of Y, M and C after they have been subjected to UCR.

Selector 510 selects image data of colors for latent image formation from image signals of Y, M, C and Bk processed by the image processing means 50.

Pattern generator 511 conducts pulse width modulation processing for Y, M, C and Bk signals which are color-corrected chromatic color components by comparing with a reference wave, and outputs the pulse-width-modulated image signals of Y, M, C and Bk in the sequence of their surfaces. The image data of the aforesaid image signals are outputted to laser writing unit 20 in image writing unit B.

Further, image signals from peripheral output device 52 such as a computer or a word processor are outputted to black component extraction unit 503 of image processing means 50. The image data, however, may also be outputted to laser writing unit 20 directly.

With regard to image signals after being subjected to complementary color conversion, black component extraction or color correction by means of image processing means 50, or image signals outputted from peripheral output device 52, either one of image signals of yellow (Y) as the first color, image signals of magenta (M) as the second color, image signals of cyan (C) as the third color and image signals of black (Bk) as the fourth color, are outputted to laser writing unit 20 that is an exposure means when a latent image of each color is formed.

Next, image forming unit B will be explained as follows, referring to FIG. 1 which is a diagram, of primary structure of the color copying machine of the present invention.

In FIG. 1, photoreceptor belt 15 that is an image forming member is one wherein a photosensitive layer is provided on the surface of its flexible belt through a method of evaporation or coating, and it is spread between driving roller 16 and driven roller 17. The driving roller 16 rotates through a driving gear (not shown) that is engaged with a gear provided on apparatus main body 10, and it causes the photoreceptor belt 15 to rotate clockwise. Further, by means of clearance-keeping member 18, the clearance between developer 21 and the photoreceptor 15 is kept constant, enabling an excellent image to be formed stably. Although, photoreceptor belt 15 is used as an image forming member in the present example, the invention is not limited only to this but is applicable also to a conventional image forming member having thereon a photosensitive layer such as a photoreceptor drum.

There are provided charging means 19, exposure means 20, developing means of developers 21Y, 21M, 21C and 21Bk, transfer means 22 and cleaning means 23 around the photoreceptor belt 15.

The charging means 19 is provided for the purpose of uniformly charging with a predetermined polarity a photosensitive layer on the surface of the photoreceptor belt 15, and it may be represented by conventional charger 19 such as a corona charger or a scorotron charger, and the scorotron charger is preferably used for an OPC photoreceptor.

The exposure means is semiconductor laser writing unit 20 and it causes the surface of the photoreceptor belt 15 charged by the charger 19 to be exposed so that an electrostatic latent image may be formed on the surface.

The developing means comprises plural developers 21Y through 21Bk each containing a differently colored developer, for example, a differently colored toner (developer) out of, for example, yellow, magenta, cyan and black. Each of these developers 21Y through 21Bk has the function of visualizing an electrostatic latent image on the photoreceptor belt 15 as a toner image through a non-contact developing method. This non-contact developing method, unlike a contact developing method, neither damages a toner image formed in the previous cycle on the photoreceptor belt 15 nor interrupts the movement of the photoreceptor belt 15. Therefore, it may offer an excellent color image. The developing means is not limited only to the color development using four colors, as in the present example, but it is also applicable to mono-color, two-color or three-color development, wherein the developers in quantity corresponding to the number of toner colors to be used have only to be provided around the photoreceptor belt 15.

The transfer means transfers toner images formed on the photoreceptor belt 15 onto a transfer material by means of transferring unit 22 such as a transfer corona discharger. In place of the transferring unit 22, a conventional transferring member such as a transfer drum may also be used as a transfer means.

The cleaning means 23 is provided with cleaning blade 231, and is arranged so that it may be kept away from the surface of the photoreceptor belt 15 during the image forming process and may further be caused to be in pressure-contact with the surface of the photoreceptor belt 15 for cleaning it only when cleaning the surface after transferring toner images on the surface onto the transfer material.

Toner collecting box 24 is one wherein toners removed by the cleaning means 23 from the photoreceptor belt 15 are collected therein through toner collecting tube 241 by means of a waste toner screw.

Toner hopper 25 is one for storing toners to be supplied by a supply screw (not shown) to the aforementioned developers 21Y through 21Bk.

In the present example, processing units such as photoreceptor belt 15, charging unit 19, developers 21Y through 21Bk, cleaning means 23, toner collecting box 24 and hopper 25, of which an image forming process portion of image forming unit B in the image forming apparatus mentioned above is composed, are provided in process cartridge 26 in a body to form a unit which may be mounted detachably on the apparatus main body 10. However, processing units to be provided in the process cartridge 26 to form a unit are not limited to those mentioned above, and they are naturally allowed to form a unit which is different from the present example.

The image forming apparatus 10 in the present example is a copying machine provided with a copy mode for obtaining a copy through the process of image-forming for data read from a document and a print mode for forming an image on a transfer material based on image data from output devices such as a computer or a word processor through the image forming unit of the present apparatus, thus, having also a printing function.

For the purpose of simplifying explanation of the present example, an example wherein the same images are formed continuously on the image forming apparatus 10 whose maximum paper size is A-3 will be stated as follows. Incidentally, the circumferential length of the photoreceptor belt 15 is assumed to be 420+α mm because the length of A-3 size is 420 mm. (In this case, α=30-100 mm. This value represents a necessary length which does not reflect that carriage 12 returns to its initial position when a document in A-3 size is copied.)

Copy Mode

First, a copy mode to conduct image forming for data read from a document, namely, a process relating to a copy of color image formation, carried out by a color image forming apparatus having the aforementioned structure, will be explained, referring to FIGS. 1-3.

In the arrangement of the present example, the maximum image size is A-3, the circumferential length of the photoreceptor belt 15 is determined to be the minimum necessary length to cover the A-3 size in order to make the apparatus main body 10 small, and carriage 12 and movable mirror unit 13 can not return to their initial positions within a period of time for the photoreceptor belt 15 to make one turn. Therefore, an explanation will be given, discriminating between copying for sizes other than A-3 size and copying for A-3 size. Incidentally, in the following example, an explanation will be given for the case where images are formed on a transfer material of A-4 size and a transfer material of A-3 size.

Copy of A-4 Size

When copy signals are outputted from process controller 53, input controlling unit 54 and image forming controller 55 control image reading unit A and image forming unit B based on the copy signals.

The input controlling unit 54, when copy signals are inputted, drives an image reading optical unit composed of the carriage 12 and movable mirror unit 13 and reads a document on document table 11 as color image data of blue image data (B), green image data (G) and red image data (R) at image reading portion 14. Then, the read color image data are subjected to complementary color conversion, black component extraction and color correction, carried out by the image processing means 50 so that they may be image-processed as color image signals of Y, M, C and Bk.

Then, selector 510, controlled by the process controller 53, selects and outputs color image signals of B, G, R and Bk which have been image-processed in succession as a one image signal on a time basis.

Then, image forming controller 55 controlled by process controller 53 controls image forming unit B as follows.

Namely, when the image signals are inputted in the laser writing unit 20, a semiconductor laser (not shown) in the laser writing unit 20 irradiates a laser beam. The laser beam hits polygon mirror 201 which is rotated by a driving motor (not shown) and is deviated after reflection on the polygon mirror 201, and is projected, in a scanning manner, on the peripheral surface of the photoreceptor belt 15 which is uniformly charged by charging unit 19 in advance to a level of predetermined charges, after being led through fθ lens, cylindrical lens 204 and three mirrors 203, so that the laser beam may form an emission line on the surface of the photoreceptor belt 15.

With regard to the direction making a right angle with the emission line, which is called a sub-scanning direction, on the other hand, a belt index, (not shown) corresponding to the specific position on the photoreceptor belt 15, is detected, or print commanding signals are received, and a main-scanning line with which modulation of the semiconductor laser by means of image signals, is determined based on the detection or commanding signals which serve as a standard. After scanning is started, with regard to the main-scanning direction, a laser beam is detected by an index sensor (not shown), modulation of the semiconductor laser by means of image signals for the color is started based on the standard of the detected signals, and the modulated laser beam scans the surface of the photoreceptor belt 15. Therefore, owing to both main-scanning by means of a laser beam and sub-scanning by means of conveyance of the photoreceptor belt 15, a latent image for the first color is formed on the surface of the photoreceptor belt 15 which is uniformly charged. This latent image is developed by developer 21Y containing yellow toners corresponding to the first color among plural developing means and thereby a yellow toner image is formed on the surface of the photoreceptor belt 15. After that, the photoreceptor belt 15, having thereon a yellow toner image, passes through the under side of cleaning blade 231 that is kept away from the surface of the photoreceptor belt 15, and then it enters a cycle of image forming for the second color.

Similarly to image forming for the first color, mentioned above, the photoreceptor belt 15, on which a yellow toner image is formed, is charged by charging unit 19 again, and then, image signals for the second color, (magenta) read and image-processed by image reading unit A, are inputted into the laser writing unit 20. Thus, writing on the surface of the photoreceptor belt 15 is conducted in the same manner as in the case of image signals for the aforementioned first color, and a latent image is formed. The latent image is developed by developer 21M containing magenta toners as the second color. A magenta toner image is formed in the presence of the yellow toner image which has already been formed.

In the same manner, a latent image formed by image signals for the third color is developed by developer 21C containing cyan toners, and a cyan toner image is formed. Further, a latent image formed by image signals for the fourth color is developed by developer 21Bk containing black toners, and a black toner image thus obtained is superimposed on the surface of the photoreceptor belt 15 and thereby a color toner image is formed on the surface of the photoreceptor belt 15.

On each of these developers 21, DC or DC plus AC bias voltage is impressed so that reversal development (jumping development) may be conducted, on a non-contact basis, on the photoreceptor belt 15 whose base substance is grounded. Further, developers which are not required for development are do not operate so that unnecessary toners are not supplied to a latent image and toner images on the photoreceptor belt 15 are not damaged.

Incidentally, any of mono-component developing agent and two-component developing agent may be used for the non-contact development. When a mono-component developing agent is used, it is not necessary to provide a toner hopper and a toner concentration detecting means, separately from the developing unit, and thereby, it is possible to make the apparatus small. From the viewpoint of stable development, however, a development method employing a two-component developing agent is more preferable.

As stated above, a color toner image, formed on the surface of the photoreceptor belt 15, is transferred onto a transfer material which is fed from sheet cassette 27 by means of sheet feeding roller 28 and is synchronized with the aforesaid color toner image by means of timing roller 29. Transfer unit 22 is impressed with high voltage power source whose polarity is opposite to that of toners, for transferring.

The transfer material on which color toner images have been transferred is separated by the photoreceptor belt 15 which changes its direction sharply (with a small radius of curvature) along driving roller 16, and is conveyed upward by conveyance belt 30. Incidentally, the conveyance belt 30 is equipped with sucking means 301, and thereby the transfer material can be conveyed upwardly surely while being sucked. Then, the transfer material, after toners thereon are melted and fixed by fixing roller 31, that is a fixing means, is ejected out of the apparatus main body 10 by sheet ejection roller 32.

On the other hand, the photoreceptor belt 15 from which color toner images have been transferred to a transfer material is further moved clockwise, and thereby toners staying on the photoreceptor belt 15 are removed by cleaning means 23 whose cleaning blade 231 is in pressure-contact with the belt, for cleaning thereof. After cleaning is completed, the cleaning blade 231 is brought away from the photoreceptor belt 15 to enter the following image forming process.

Figure 3:
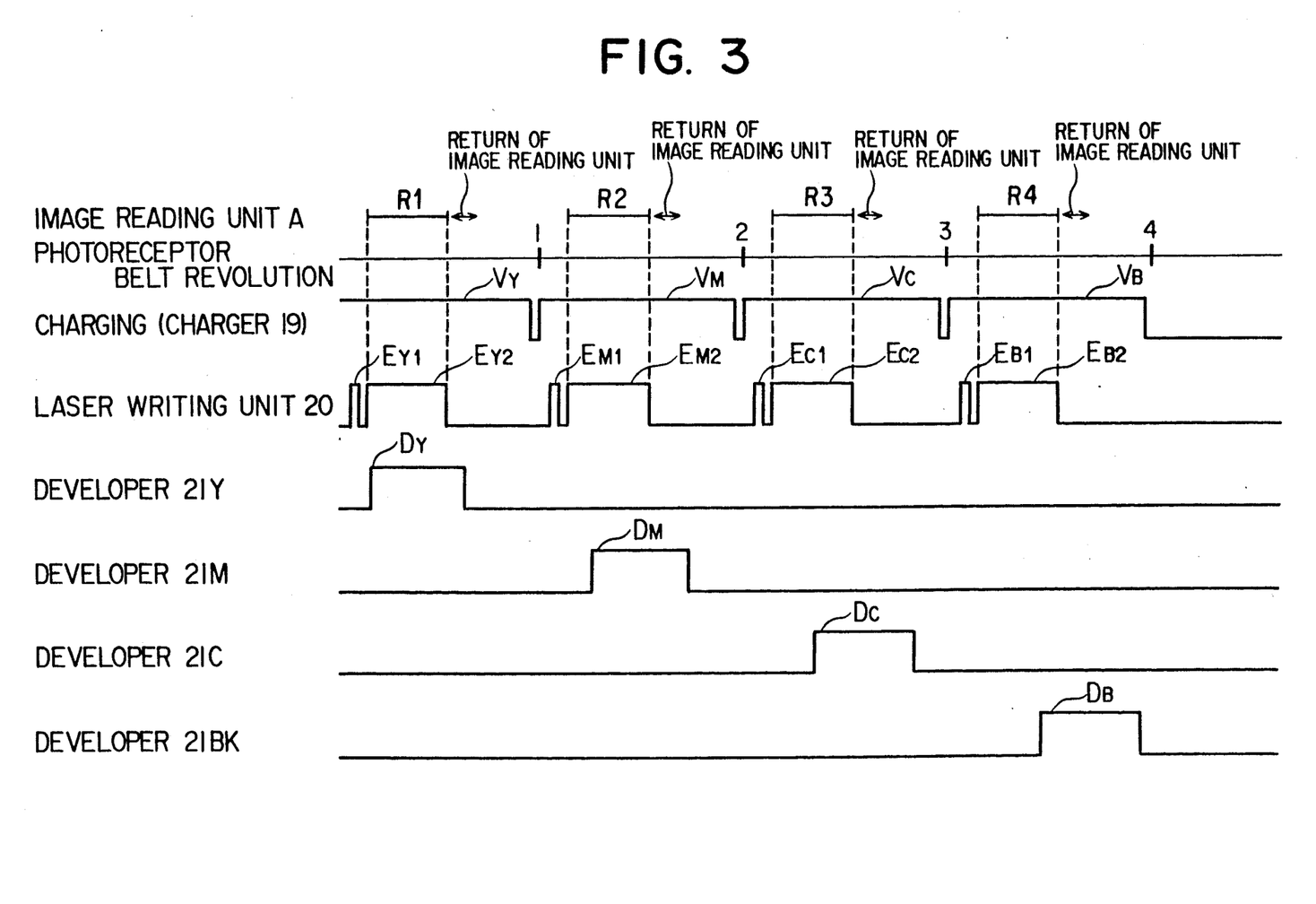
FIG. 3 is a timing chart for each processing unit in 1-round (page) process.

FIG. 3 shows a timing chart of a process relating to copying of a color document mentioned above. Incidentally, when each means is in operation, it is shown with a high level. Further, $E_{Y1}$, $E_{M1}$, $E_{C1}$ and $E_{B1}$ in FIG. 3 correspond to so-called standard patches written for standard toner image forming. These patches are developed respectively by developers 21Y, 21M, 21C and 21Bk with developing timing of $D_Y$, $D_M$, $D_C$ and $D_B$, and toner images thus obtained are measured by reflection densitometer 33 for detection of development conditions. Data obtained from the measurement are fed back to the adjusting means for each of toner concentration, charging voltage, amount of exposure and development bias, for adjustment.

Further, each of $R_1$, $R_2$, $R_3$ and $R_4$ in FIG. 3 represents timing with which the image reading unit A reads a document placed on document table 11, while $V_Y$, $V_M$, $V_C$ and $V_B$ represent respectively charging timing of development for yellow, magenta, cyan and black. $E_{Y2}$, $E_{M2}$, $E_{C2}$ and $E_{B2}$ respectively represent timing for writing with laser writing unit 20 the image signals respectively for yellow, magenta, cyan and black read and image-processed respectively with timing $R_1$, $R_2$, $R_3$ and $R_4$, and latent images formed through writing mentioned above are visualized respectively by developers 21Y, 21M, 21C and 21Bk for yellow, magenta, cyan and black with timing $D_Y$, $D_M$, $D_C$ and $D_B$ respectively including standard patches and image areas.

Hereinafter, the process mentioned above is called a 1-round process (or 1-page process) because one image of one color is formed while the photoreceptor belt 15 makes one turn.

Copy of A-3 Size

The process for copy of A-3 size is mostly the same as that for copy of A-4 size (1-round process) mentioned above. However, a reading optical unit composed of carriage 12 and movable mirror 13 can not return to its initial position while the photoreceptor belt 15 whose circumferential length is marginal against A-3 size makes one turn, and therefore, image reading unit A cannot synchronize with the photoreceptor belt 15. Therefore, the process for copy of A-3 size is one for overcoming the above problems.

Similarly to image forming of the aforementioned 1-round process, the photoreceptor belt 15 is Charged by charging unit 19 again, then image signals for the first color (yellow) read and image-processed by image reading unit A and selected by selector 510 are inputted into the aforementioned laser writing unit 20 and then written on the surface of the photoreceptor belt 15 to form a latent image, similarly to the case of the aforesaid 1-round process. The latent image is developed by developer 21Y containing yellow toners as the first color. After that, the photoreceptor belt 15 having thereon a yellow toner image passes through the under side of cleaning blade 231 that is kept away from the surface of the photoreceptor belt 15. Unlike the previous 1-round process, the photoreceptor belt 15 is conveyed again. The reason behind this is to cause a reading optical unit composed of carriage 12 and movable mirror 13 to return to its initial position in the period of the additional one rotation of the photoreceptor belt 15 because the reading optical unit cannot return to its initial position during the first rotation of the photoreceptor belt 15. The photoreceptor belt 15 passes again through the under side of the cleaning blade 231 being kept away from the surface of the photoreceptor belt 15, while having thereon a yellow toner image. After that, in the third rotation of the photoreceptor belt 15, image forming for the second color of magenta is conducted synchronizing with the yellow toner image.

In the period of the third rotation of the photoreceptor belt 15, a latent image, formed with image signals for the second color, is developed by developer 21M containing magenta toners and thereby a magenta toner image is formed. In the period of the fifth rotation of the photoreceptor belt 15, a latent image formed with image signals for the third color is developed by developer 21C containing cyan toners and thereby a cyan toner image is formed, and in the period of the seventh rotation of the photoreceptor belt 15, a latent image formed with image signals for the fourth color is developed by developer 21Bk containing black toners and the black toner image thus obtained is superimposed on the surface of the photoreceptor belt. Thus a complete color toner image is formed on the surface of the photoreceptor belt 15.

After a color toner image is formed on the photoreceptor belt 15, transferring and fixing of the image on the transfer material are conducted and the transfer material is ejected.

Figure 4:
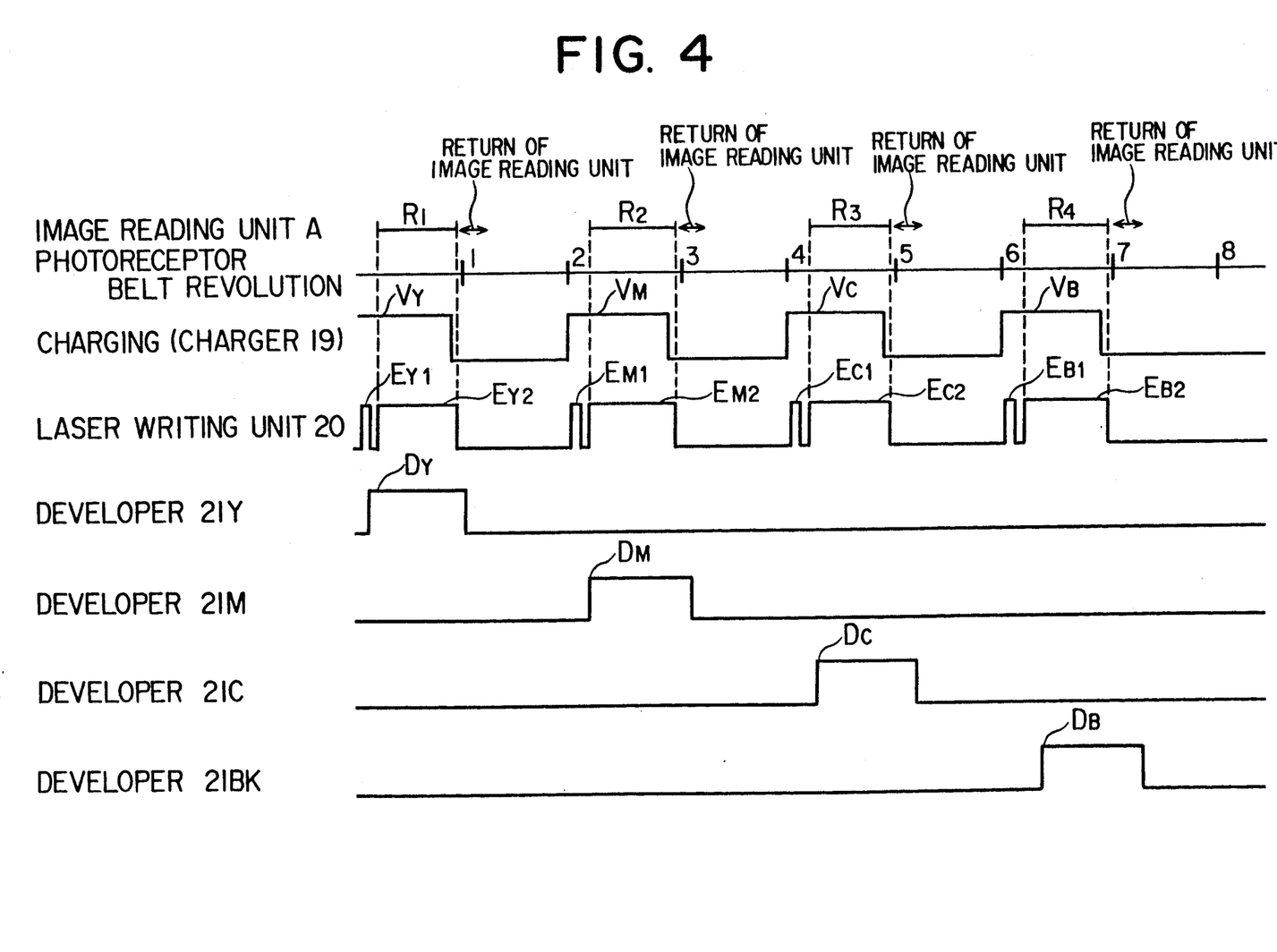
FIG. 4 is a time chart for each processing unit in 2-round process.

FIG. 4 shows a timing chart for the process related to the case for copying the aforesaid document on the transfer material in A-3 size. Again, when each means is in operation, it is shown with a high level. Further, $E_{Y1}$, $E_{M1}$, $E_{C1}$ and $E_{B1}$ in FIG. 4 correspond to so-called standard patches written for standard toner image forming. These patches are developed respectively by developers 21Y, 21M, 21C and 21Bk with developing timing of $D_Y$, $D_M$, $D_C$ and $D_B$, and toner images thus obtained are measured by reflection densitometer 33 for detection of development conditions. Data obtained from the measurement are fed back to the adjusting means for each of toner concentration, charging voltage, amount of exposure and development bias, for adjustment.

Further, each of $R_1$, $R_2$, $R_3$ and $R_4$ in FIG. 4 represents timing with which the image reading unit A reads a document placed on document table 11, while $V_Y$, $V_M$, $V_C$ and $V_B$ represent respectively charging timing for development for Yellow, magenta, cyan and black. $E_{Y2}$, $E_{M2}$, $E_{C2}$ and $E_{B2}$ respectively represent timing for writing with laser writing unit 20 the image signals respectively for yellow, magenta, cyan and black, read and image-processed respectively with timing $R_1$, $R_2$, $R_3$ and $R_4$, and latent images formed through writing mentioned above are visualized respectively by developers 21Y, 21M, 21C and 21Bk for yellow, magenta, cyan and black with timing $D_Y$, $D_M$, $D_C$ and $D_B$ respectively including standard patches and image areas.

In FIG. 4, when making copies on a transfer material in A-3 size, image forming is conducted within the first rotation of the photoreceptor belt 15 synchronizing with a reading optical unit of image reading unit A, and in the second rotation of the photoreceptor belt 15, the scan-reading optical unit is returned to its initial position. After that, the photoreceptor belt 15 and the image reading unit A are synchronized for image forming in each odd-numbered rotation of the photoreceptor belt 15, and the scan-reading optical unit is returned to its initial position in each even-numbered rotation of the photoreceptor belt 15. Namely, in copying for A-3 size, one cycle of reading an image on a document and forming of an image is conducted for every two rotations of the photoreceptor belt 15.

Hereinafter, the process mentioned above is called a 2-round process because one image of one color is formed while the photoreceptor belt 15 makes two turns.

Print Mode

Next, a print mode in which an image forming unit of the present apparatus forms an image on a transfer material using image data from a peripheral device such as a computer or a word processor, namely a process wherein image forming unit B of the aforesaid color image forming apparatus is used for forming a color image on a transfer material, will be explained, referring to FIGS. 1, 2 and 5.

Process control means 53 selects a process based on image size information among image signals for image forming stored in peripheral input device 52. Namely, the process control means 53 selects either the aforesaid 1-round (page) process or a 2-page process, which will be explained later, depending on an image size of one page to be formed, and controls image forming unit B based on the process selected.

In the print mode, image signals are outputted from a page memory of peripheral output device 52 directly to laser writing unit 20 and therefore, it is not necessary to control image reading unit A, which is different from the aforementioned copy mode. Therefore, the following two cases are exemplified separately, because it is possible to form an image to the maximum size capable of being formed on the photoreceptor belt 15. Since the maximum image size is A-3 in the present example, size of an image to be formed is separated into A-4 or smaller than that and B-4 or larger than that. Since no image reading unit A is used, even when an image size is the maximum of A-3, it does not need to be discriminated in particular, which is different from the aforesaid copy mode.

An example wherein image forming is conducted both on an A-4 size transfer material and on an A-3 size transfer material will be explained as follows.

Print of A-4 Size

Based upon image size information (information that an image size is A-4) coming from peripheral output device 52, the process control means 53 outputs print signals of 2-page process to peripheral output device 52 and to image forming unit controller 55. Based on signals from the process control means 53, the peripheral output device 52 and image forming unit 55 conduct image forming in the 2-page process as follows according to the print signals.

The peripheral output device 52 outputs respective image signals of yellow, magenta, cyan and black for forming images to laser writing unit 20 twice each, synchronizing with image forming unit B.

On the other hand, image forming controller 55, controlled by process controller 53, controls the image forming unit B.

Namely, as in the case of image forming in the copy mode, the photoreceptor belt 15 on which a yellow toner image has been formed is charged by charging unit 19 again, and then, image signals for the first color (yellow) outputted from peripheral device 52 are inputted into the laser writing unit 20 and thereby writing on the surface of the photoreceptor belt 15 is conducted to form a latent image for the first image page.

Further, when the latent image for the first image page has been formed, the photoreceptor belt 15 still has an excessive length for forming a latent image for the second image page. Therefore, image signals for yellow are outputted immediately to the laser writing unit 20 and thereby a latent image for the second image page is formed in the same manner as in the foregoing.

Accordingly, two latent images for two image pages corresponding to image signals for yellow are formed on the photoreceptor belt 15.

These latent images are developed by developer 21Y containing yellow toners corresponding to the first color among developing means, thus, a yellow toner image is formed on the surface of the photoreceptor belt 15. After that, the photoreceptor belt 15, while keeping thereon the yellow toner image, passes through the under side of cleaning blade 231 which is kept away from the surface of the photoreceptor belt 15, and enters image forming for the second color.

A latent image for the second image page formed by image signals for the second color is developed by developer 21M containing magenta toners in the same way as in the foregoing to form a magenta toner image, a latent image for the second image page formed by image signals for the third color is developed by developer 21C containing cyan toners to form a cyan toner image, and further, a latent image for the second image page formed by image signals for the fourth color is developed by developer 21Bk containing black toners to superimpose a black toner image on the surface of the photoreceptor belt 15. Thus, a complete color toner image is formed on the surface of the photoreceptor belt 15.

The color toner image for the second image page formed on the surface of the photoreceptor belt 15, as explained above, is transferred onto a transfer material which is fed out from sheet feeding cassette 27 by sheet feeding roller 28 and is synchronized by timing roller 29 with a color toner image for the first image page. After that, the color toner image for the second image page is transferred onto a transfer material synchronized with the color toner image for the second image page.

After the foregoing, the toner image on the photoreceptor belt 15 is transferred onto a transfer material and fixed thereon, and the transfer material is ejected out of an apparatus in the same process as in the aforementioned copy mode.

Figure 5:
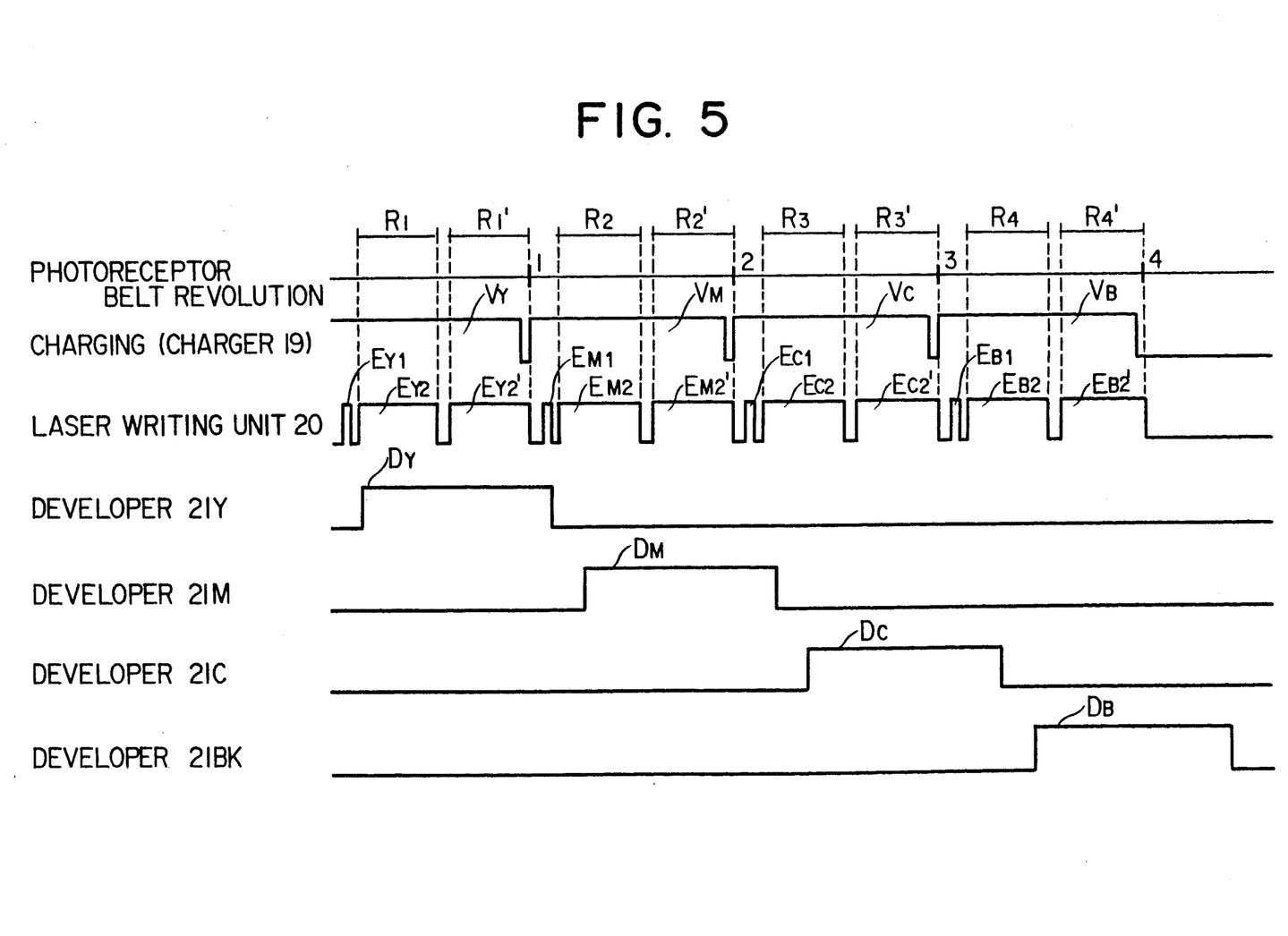
FIG. 5 is a timing chart for each processing unit in 2-page process.

FIG. 5 shows a timing chart of a process related to continuous printing of color images each being of the aforementioned A-4 size. Incidentally, when each means is in operation, it is shown with a high level. Further, $E_{Y1}$, $E_{M1}$, $E_{C1}$ and $E_{B1}$ in FIG. 5 correspond to so-called standard patches written for standard toner image forming. These patches are developed respectively by developers 21Y, 21M, 21C and 21Bk with developing timing of $D_{Y1}$, $D_{M1}$, $D_{C1}$ and $D_{B1}$, and data obtained from the development are fed back to the adjusting means for each of toner concentration, charging voltage, amount of exposure and development bias, for adjustment.

$R_1$, $R_2$, $R_3$, and $R_4$ in FIG. 5 show output of image signals for yellow, magenta, cyan and black for the first image page outputted from peripheral device 52, $R_1'$, $R_2'$, $R_3'$ and $R_4'$ show image signals of yellow, magenta, cyan and black for the second image page following the image signal output for the first image page outputted from peripheral device 52. $V_Y$, $V_M$, $V_C$ and $V_B$ respectively show charging timing of development for each of yellow, magenta, cyan and black toners, and $E_{Y2}$, $E_{M2}$, $E_{C2}$ and $E_{B2}$ as well as $E_{Y2}'$, $E_{M2}'$, $E_{C2}'$ and $E_{B2}'$ respectively show timing with which image signals for yellow, magenta, cyan and black are written by laser writing unit 20 with timing of $R_1$, $R_2$, $R_3$ and $R_4$ as well as $R_1'$, $R_2'$, $R_3'$ and $R_4'$, and latent images formed by writing by a laser are visualized by developers 21Y, 21M, 21C and 21Bk respectively for yellow, magenta, cyan and black with timing $D_Y$, $D_M$, $D_C$ and $D_B$ including standard patches and image forming areas.

The process mentioned above, is called a 2-page process hereinafter, because two image pages for one color are formed during a period of one rotation of the photoreceptor belt 15.

Incidentally, in the case of the 2-page process, it is preferable that a certain clearance is given between the first image page and the second image page. The reason behind this is for the easy synchronization between a transfer material and a toner image on an image forming member. For this purpose, image data for the second image page may be delayed by a process controller to be outputted to image forming unit B.

Further, although there has been shown an example wherein two color images of the same image data are formed in the present example, the invention is not limited to this, and image data for the first image page may naturally be different from those for the second image page. In this case, process controller 53 controls so that image signals outputted from peripheral device 52 may be outputted to laser writing unit 20 in the sequence of image signals of yellow for the first image page, image signals of yellow for the second image page, image signals of magenta for the first image page, ..., image signals of black for the second image page.

Print of A-3 Size

Based on an image size information (information that the image size is A-3) from input controlling unit 54, the process controller 53 outputs print signals for the first image page process to peripheral device 52 and to image forming controller 55. Then, based on signals from the process controller 53, the peripheral device 52 and image forming unit 55 form an image through 1-page process based on the aforementioned print signals.

The 1-page process is the same as the 1-round process in the aforementioned copy mode. However, in the 1-page process in the copy mode, image signals obtained from image reading unit A are inputted in laser writing unit 20, while image signals stored in peripheral device 52 are inputted in laser writing unit 20 in the 1-page process in the print mode. With regard to latent image forming, a latent image is formed according to image signals of the peripheral device 52.

Further, a timing chart for the 1-page process in the print mode is the same as that shown in FIG. 3 for the copy mode, although the image width is greater. However, $R_1$, $R_2$, $R_3$ and $R_4$ showing timing for reading a document on document table 11 with image reading unit A are those showing image signals for yellow, magenta, cyan and black outputted from the peripheral device 52, in which the period of time for the image reading optical unit to return is not needed.

Figure 6:
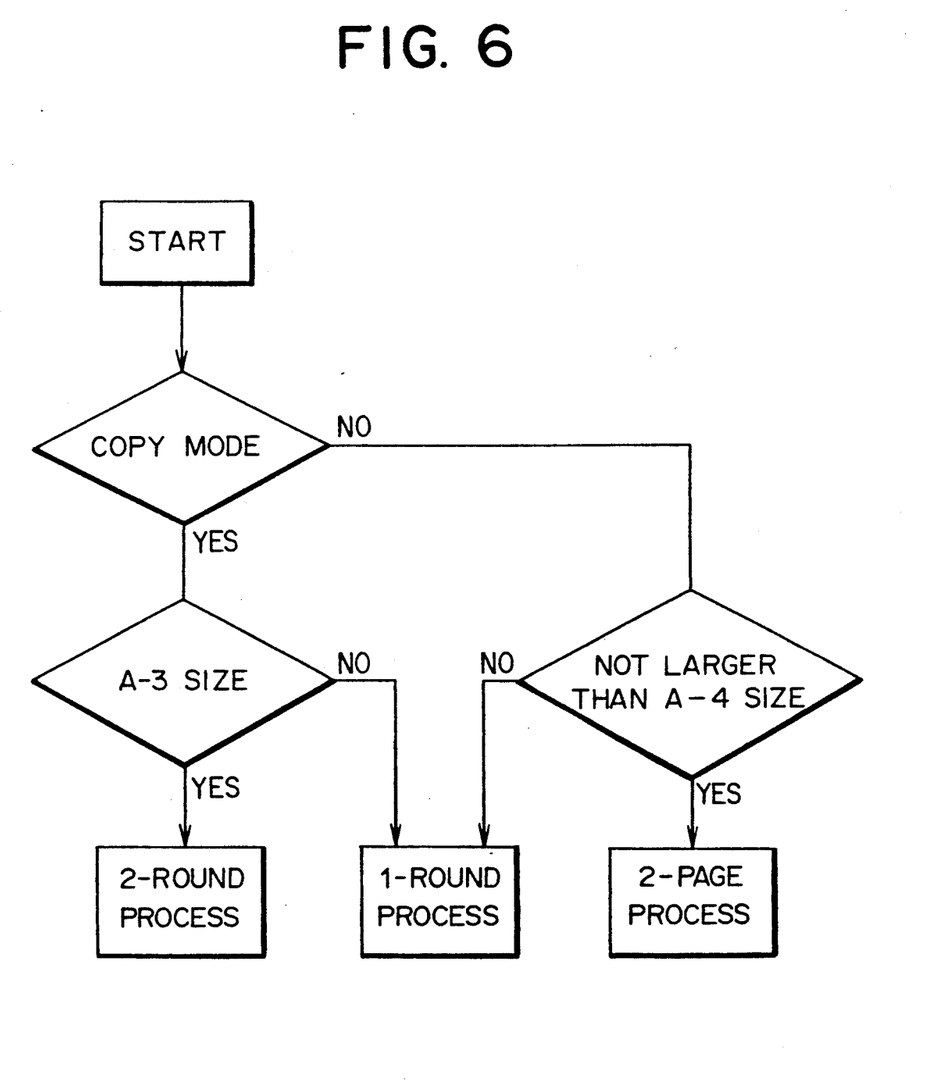
FIG. 6 is a flow chart for selection of 1-page process or 2-page process.

Selection of 1-round process (1-page process), 2-round process or 2-page process depending on size for image forming in the copy mode or the print mode on an image forming apparatus mentioned in detail above is conducted by the process controller 53. A flow chart is shown in FIG. 6.

When a start button for image forming is pressed, a copy mode or a print mode is judged by the process controller 53. This judgment is made by the signal from a button that is provided on an operation panel and is for changeover for copy mode/print mode in which the selection is made in advance.

In case of a copy mode, the process controller 53 judges whether the size of an image to be formed is A-3 or not from information including setting made by an operator, size of paper to be used and image size obtained from size detection by means of image reading unit A.

In case of the size other than A-3 size, the process controller 53 sends commands to image forming controller 55 so that an image may be formed through the 1-round process, then, the image forming controller 55 conducts image forming through the aforesaid 1-round process based on the aforementioned commands, by causing the image reading unit A and image forming unit B to be synchronized each other.

In case of the size of A-3, on the contrary, the process controller 53 sends commands to the image forming controller 55 so that an image may be formed through the 2-round process, and the image forming controller 55 causes the image forming unit B to conduct image forming through the 2-round process, based on the aforementioned commands.

In the case of a print mode, on the other hand, the process controller 53 judges whether or not the size of an image to be formed is not larger than A-4, from image size information outputted from the peripheral device 52.

When the size is not larger than A-4 size, the process controller 53 sends commands to the image forming controller 55 so that an image may be formed through the 2-page process, and the image forming controller 55 causes the image forming unit B to conduct image forming through the 2-page process, based on the commands mentioned above.

When the size is not larger than A-4 size, on the contrary, the process controller 53 sends commands to the image forming controller 55 so that an image may be formed through the 1-page process, as in the case of the 1-round process mentioned above, and the image forming controller 55 causes the image forming unit B to conduct image forming through the 1-page process, based on the commands mentioned above.

In the 1-round process or the 2-round process in the copy mode, or the 1-page process or the 2-page process in the print mode, selected as explained above, image forming is conducted through each process stated above.

Incidentally, although image forming is conducted through the aforesaid 1-round process under the conditions of the copy mode and transfer material size of A-3 size or less, the circumferential length of the photoreceptor belt 15 is determined to be $420+\alpha$ for the maximum sheet size of A-3 in the present example. Therefore, when image forming is conducted on a transfer material whose size is smaller than one half of A-3, that is, B-5 size or smaller, the image reading unit A can read a document twice during a period of one rotation of the photoreceptor belt 15, and an image reading optical unit further can return. Accordingly, image forming can be conducted also in the 2-page process.

Further, in the present example, the maximum sheet size is A-3, and when image forming is conducted on a transfer material of A-3 size in a copy mode, one image page is formed during two rotations, and when image forming is conducted on an A-4 size transfer material in a print mode, two image pages are formed simultaneously. However, the invention is not limited to this. Corresponding to the maximum size for image forming, the size changes to the transfer material of that size.

Selection of either a copy mode or a print mode may be made either by a changeover button provided on the apparatus main body 10 or by a copy button as well as a print button (both not shown). It may also be applicable that a print mode is selected only for print signals from a peripheral output device 52 and when a button provided on an operation panel (not shown) of the apparatus main body 10 is pressed, image forming is conducted in a copy mode.

Figure 7:
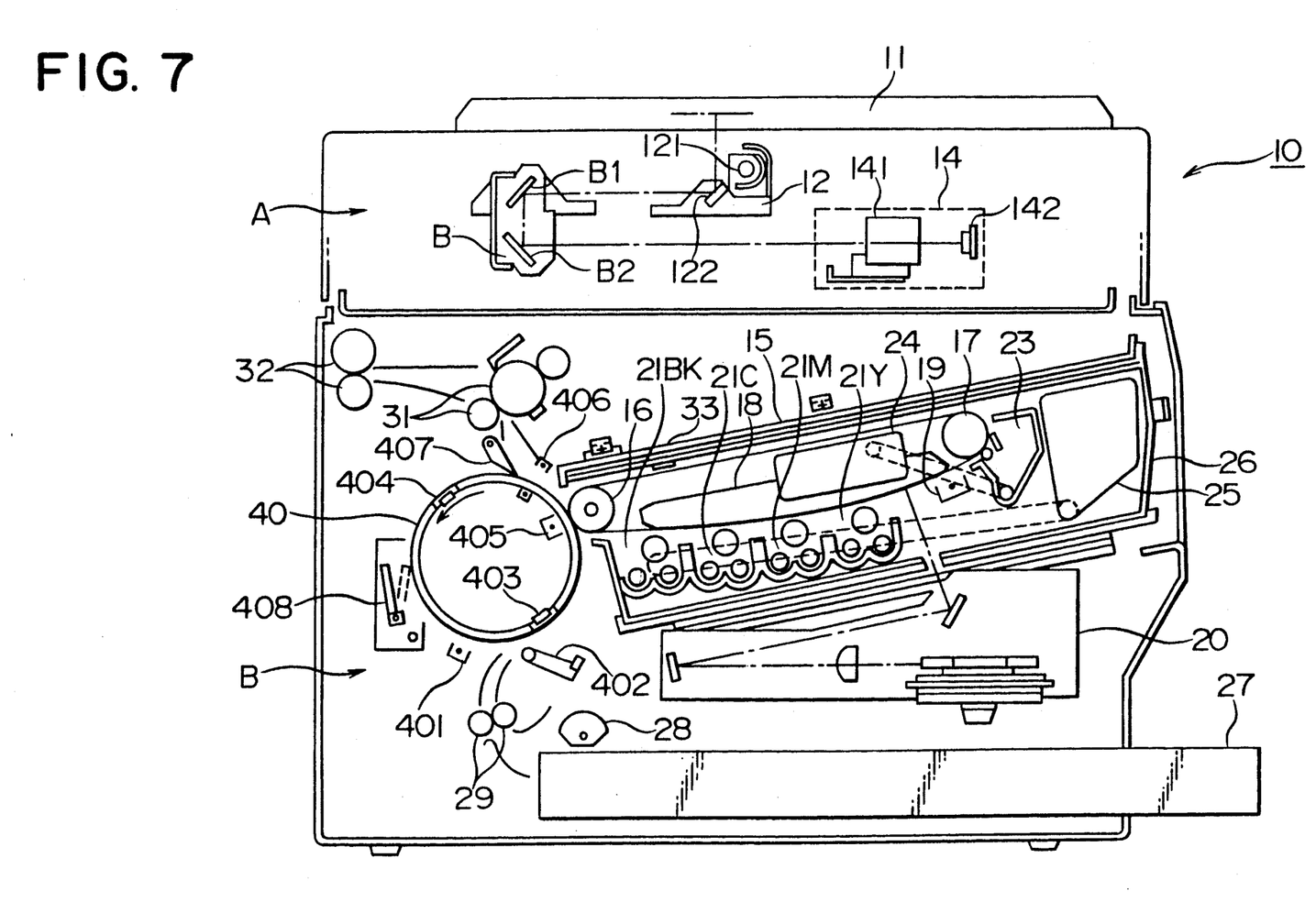
FIG. 7 is a drawing showing a color image forming apparatus of a transfer drum type that is another example of the invention.

FIG. 7 shows a color image forming apparatus of a transfer drum type as another example in which the present invention may be applied. Incidentally, the numbers used in FIG. 6 which are the same as those used in FIG. 1 represent those having the same structure or function as in the aforesaid color image forming apparatus.

In the color image forming apparatus 10 of a transfer drum type, transfer drum 40 is arranged so that it may touch the transfer portion on the photoreceptor belt 15, and the transfer drum 40 rotates counterclockwise, synchronizing with the photoreceptor belt 15. A transfer material is wound around the transfer drum 40, and a toner image of each color formed on the transfer belt 15 is transferred onto the transfer material in a manner such that toner images each having its own different color are superposed on the transfer material. After they are superimposed on the transfer material, the transfer material is separated from the transfer drum and ejected out of the apparatus main body 10.

Incidentally, in the color image forming apparatus in the present example, the circumferential length of $420+\alpha$ mm is not for the photoreceptor belt 15 but for the transfer drum, which is different from the color image forming apparatus in the aforementioned example.

Charging unit 401 functions so that a transfer material may be attracted electrostatically to the transfer drum and winding member 402 winds the transfer material round the transfer drum 40 mechanically are provided around the transfer drum 40. The winding member 402 has a roller on its tip and it touches only when the transfer material is wound around the transfer drum 40 first. Further, on the peripheral surface of the transfer drum 40, there are provided grippers 403 and 404 which hold the leading edge of the transfer material conveyed synchronously. Transfer unit 405 transfers toner images on the photoreceptor belt 15 electrostatically onto the transfer material. Both separation neutralizing electrode 406 and separation claw 407 separate the transfer material after transferring from the transfer drum 40. Cleaner 408 capable of touching the transfer drum and leaving therefrom removes residual toners staying on the transfer drum 40 after the transfer material has been separated.

A transfer material fed out of cassette 27 synchronously advances to transfer drum 40 charged by charging unit 401, and is wound around the transfer drum by winding member 402. The leading edge of the transfer material is held by gripper 403 or by grippers 403 and 404 and moves to a transfer portion where a yellow toner image formed on the photoreceptor belt 15 is transferred onto the transfer material by transfer unit 405. The transfer drum 40, on which the first transferring is completed, continues to be cleaned by cleaner 508 for transferring of the next toner image. Namely, a magenta toner image is transferred in the second rotation of the transfer drum, a cyan toner image is transferred in the third rotation and a black toner image is transferred in the fourth rotation, so that all images are superimposed. After toner images for the respective four colors have been transferred, the transfer material is neutralized by separation neutralizing electrode 406 and is separated by separation claw 407 after the leading edge of the transfer material is released from being held. Then, the transfer material is conveyed to fixing roller 31.

The present example is mostly the same as the aforementioned example. Namely, it is controlled based on a control block diagram related to process controller 53 and image processing means 50, shown in FIG. 2. Further, in the same manner as in the aforementioned example, the process controller 53 selects 1-round process or 2-round process in a copy mode, or 1-page process or 2-page process in a print mode, based on the flow chart shown in FIG. 6. Further, toner images are formed on the photoreceptor belt 15, based on time charts for 1-round (page) process, 2-round process and 2-page process shown in FIGS. 3 and 4. In this case, however, a developed toner image is transferred onto a transfer material for each color without being superimposed with images of other different colors.

Incidentally, in the aforementioned example, a color toner image is transferred onto a transfer material when the transfer material passes through a transfer portion after being fed out of sheet cassette 27. In the present example, however, a transfer material fed out of sheet cassette 27 is held on its leading edge by gripper 403 in a 1-round (page) process, and is held on its leading edge by grippers 403 and 404 in a 2-page process. Further, in the 2-page process, the leading edge of the second image page is determined by gripper 404. Therefore, the distance between the first image page and the second image page, whose latent images are formed on the photoreceptor belt 15 by laser writing unit 20, is the same as that between gripper 403 and gripper 404 on the circumferential surface of the transfer drum 40.

As stated above in detail, the present invention provides a color image forming apparatus wherein depending upon an image size, image forming may be conducted through either a 1-round process or a 2-round process in a copy mode, while, in a print mode, image forming may be conducted based on either a 1-page process or a 2-page process, whichever is selected.

As a result, when image size is small, a color image forming apparatus of the invention has advantages that a wasteful portion on an image forming member may be eliminated and operation efficiency may be enhanced by increasing the number of times for image forming in color image forming operation wherein image forming for a smaller image size is more complicated than that for a larger image size. Further, it is possible to make the circumferential length of an image forming member shorter and thereby to make the apparatus small in size and light in weight. Furthermore, the invention offers an advantage that efficient image forming can be conducted with optimum number of times for image forming in any mode of image forming.

What is claimed is:

1. A color image forming apparatus for forming images corresponding to original image data, from at least one document on recording sheets, comprising:
   means for scanning the document so that said original image data is obtained;
   means for receiving said original image data from peripheral image data generating apparatus;
   means for selecting one of a scanning mode, wherein said scanning means obtains said original image data, and a printing mode, wherein said receiving means receives said original image data;
   means for obtaining a plurality of color component images corresponding to said original image data;
   means for forming a plurality of color toner layers on an image holding means as the image, wherein each of said color toner layers corresponds to one of said color component images, said image holding means, having a rotatable endless surface, for holding said color toner layers thereon; and
   means for transferring said color toner layers onto said recording sheet,
   wherein, when said scanning mode is selected, said image holding means rotates a predetermined number of times according to the size of said image when forming one of said color toner layers on said image holding means, and, when said printing mode is selected, said forming means forms each of said color toner layers for at least one document according to the size of said image while said image holding means rotates once.

2. The apparatus of claim 1, wherein, when said scanning mode is selected, said image holding means rotates twice when the size of said image is the maximum size that can be formed by the apparatus when forming one of said color toner layers on said image holding means.

3. The apparatus of claim 1, wherein, when said scanning mode is selected, said image holding means rotates when the size of said image is less than the maximum size that can be formed by the apparatus when forming one of said color toner layers on said image means.

4. The apparatus of claim 1, wherein, when said printing mode is selected, said forming means forms each of said color toner layers for two documents when the size of said image is not more than one half of the maximum size that can be formed by the apparatus, while said image holding means rotates once.

5. The apparatus of claim 1, wherein, when said printing mode is selected, said forming means forms each of said color toner layers for one document when the size of said image is more than a half of the maximum size that can be formed by the apparatus, while said image holding means rotates once.

6. A color image forming apparatus for forming an image corresponding to original image data from at least one document on at least one recording sheet, comprising;
   means for scanning the document so that said original image data is obtained;
   means for receiving said original image data from a peripheral image data generating apparatus;
   means for selecting one of a scanning mode, wherein said scanning means obtains said original image data, and a printing mode, wherein said receiving means obtains said original image data;

means for obtaining a plurality of color component images corresponding said original image data;

means for forming a plurality of color toner layers on an image holding means, wherein each of said color toner layers corresponds to one of said color component images, said image holding means, having a rotatable endless surface, for holding said color toner layers thereon; and means for transferring said color toner layers onto said recording sheet, wherein, when said scanning mode is selected, said image holding means rotates for forming each of said color toner layers on said image holding means so that a color toner image comprising said plurality of color toner layers is formed on said rotatable endless surface, and, when said printing mode is selected, said forming means forms each of said color toner layers for at least one of said documents while said image holding means rotates once, so that a color toner image comprising said plurality of color toner layers is formed on said rotatable endless surface.

7. The apparatus of claim 6, wherein, when said printing mode is selected, said forming means forms each of said color toner layers of two documents when the size of said image is not more than one half of the maximum size that can be formed by the apparatus, while said image holding means rotates.

8. The apparatus of claim 6, wherein, when said printing mode is selected, said forming means forms each of said color toner layers for one document when the size of said image is more than one half of the maximum size that can be formed by the apparatus, while said image holding means rotates once.

* * * * *

UNITED STATES PATENT AND TRADEMARK OFFICE
CERTIFICATE OF CORRECTION

PATENT NO. : 5,198,865
DATED : March 30, 1993
INVENTOR(S) : Satoshi Haneda et al.

It is certified that error appears in the above-indentified patent and that said Letters Patent is hereby corrected as shown below:

Claim 3, column 16, line 43, insert --once-- after "rotates".

Claim 7, column 18, line 11, insert --once-- after --rotates--.

Signed and Sealed this

Fifth Day of April, 1994

BRUCE LEHMAN

Attest:

Attesting Officer      Commissioner of Patents and Trademarks